3,075,963
Patented Jan. 29, 1963

3,075,963
METHOD OF PREPARING CELLULOSE DERIVATIVE SULFATES
Gordon D. Hiatt and Martin E. Rowley, Rochester, N.Y., assignors to Eastman Kodak Company, Rochester, N.Y., a corporation of New Jersey
No Drawing. Filed Sept. 16, 1960, Ser. No. 56,348
2 Claims. (Cl. 260—215)

This invention relates to a method of preparing cellulose derivative sulfates in which cellulose or cellulose material is esterified with an esterification mixture of acetic anhydride, alkali metal acetyl sulfate and acetyl sulfuric acid at a moderate temperature.

Various methods have been described in the prior art for preparing cellulose acylate sulfates such as those of U.S. Patents Nos. 1,866,532 of Haskins and 2,582,009 and 2,622,079 of Crane. The procedures described by Haskins involve reacting upon cellulose with an esterifying bath of lower fatty acid anhydride and a pyridine salt of sulfuric acid in an excess of amine. The quantity of acyl introduced depends upon the amount of anhydride employed. The first patent to Crane relates to the preparation of cellulose acylate sulfates in acid form followed by neutralization after completion of the reaction. The Haskins method is expensive due to the high cost of organic amines. The Crane method is critical in operation because of the use of strong mineral acid as the sulfating agent. In that procedure a lower temperature and precise control are desirable to minimize degradation and when properly operated, good products may be obtained thereby.

The second patent issued to Crane describes the use of an inorganic salt of sulfuric acid plus a slight excess of free sulfuric acid to catalyze the acylation portion of the reaction. This procedure results in the presence of neutral sodium sulfate in the mass, the presence of which, in substantial quantities, it is desirable to avoid.

One object of our invention is to provide a procedure for the preparation of cellulose acetate sulfates which avoids any substantial formation of sodium sulfate in the esterification mass. Another object of our invention is to provide a method of making cellulose acetate sulfates in which substantial quantities of both sulfur and acetyl are chemically combined with the cellulose. A further object of our invention is to provide a process for making cellulose acylate sulfates in which cellulose or a cellulose ester is esterified with a mixture of an acetic anhydride, an alkali metal acetyl sulfate and acetyl sulfuric acid. Other objects of our invention will appear herein.

In its broadest aspects our invention comprises reacting upon cellulose or a hydroxyl containing cellulose material such as a partially hydrolyzed cellulose ester with acetic, anhydride, acetyl sulfuric acid and an alkali metal acetyl sulfate. The esterification is carried out at a temperature of 50–120° F. No substantial amount of neutral sodium sulfate forms and substantial esterification of the cellulose is obtained. Ordinarily, it is desirable to employ cellulose as the starting material but instead one may, if desired, employ a partially hydrolyzed cellulose ester or mixed ester such as cellulose acetate having an acetyl content of 32% or cellulose propionate having a hydroxyl content of approximately 7%.

The sulfating agent, a mixture of alkali metal acetyl sulfate and acetyl sulfuric acid, is prepared and mixed with lower fatty acid anhydride to form the esterification mixture. To prepare the mixture of acetyl sulfuric acid and its salt, sulfuric acid is slowly added to the acetic anhydride, the temperature not being allowed to exceed about 35° C. to inhibit the formation of sulfoaliphatic acid and to form the acetyl sulfuric acid whereupon sodium acetate is added to the mass in amount sufficiently limited that it will neutralize a portion of the acid to form alkali metal acetyl sulfate in admixture with the acid, this reaction being carried out at a reduced temperature (not more than 35° C.). The amount of sulfuric acid used in preparing the sulfating agent should be sufficient that the acyl sulfuric acid prepared will combine with all of the sodium acetate employed. In making up the esterifying bath there should have been sufficient sulfuric acid used that an excess of 3.5–27 parts thereof per 100 parts of cellulose was supplied thereto. As a consequence, the esterifying bath contains the mixture of acetyl sulfuric acid and its sodium salt as the sulfating agent. Conveniently, the sulfating agent may be prepared by slowly adding to 500 parts of stirred acetic anhydride which has been cooled to 5° C., 200 parts of 95% sulfuric acid at a temperature maintained below 20° C. and then adding to the stirred mass 152.2 parts of powdered anhydrous sodium acetate while keeping at a temperature below 35° C., the stirring being continued until the sodium acetate has disappeared and a clear solution is obtained. If the sulfating agent is not to be employed immediately after its preparation, it should be held at a lowered temperature such as below 25° C. until it is mixed with the cellulose.

It is desirable to subject the esterification product after its preparation to a mild hydrolysis prior to neutralization of the used esterification bath. This is accomplished by adding water to the mass at the end of the cellulose esterification in an amount in excess of that required to react with the acid anhydride present. This procedure ordinarily improves the dry heat stability of the product. The dry heat stability of the product is also improved by an extended mixing time after neutralization of the catalyst. For instance, when sodium acetate, sodium carbonate or the like is added to neutralize the acid salt in the used esterification bath and the containing vessel is subjected to a 100° F. temperature, agitation of the mass for a short time is often desirable.

The following examples illustrate our invention:

*Example 1*

200 parts of 95% sulfuric acid were added slowly with stirring to 500 parts of acetic anhydride cooled to 5° C., the temperature being kept below 20° C. While continuing the stirring, 152.2 parts of powdered anhydrous sodium acetate were added, the solution being kept below 35° C. during the addition. Stirring was continued until a clear solution was obtained. The solution was held at about 20° C. until mixed with 540 parts of acetic acid, 250 parts of acetic anhydride and 13 parts of sulfuric acid. To the mixture, cooled to 60° F., was added 300 parts of cellulose wet with 410 parts of acetic acid as a result of having been activated with water and dewatered with acetic acid. The temperature was allowed to rise to and maintained at 100° F. until a water soluble product was obtained.

At the end of the reaction, a mixture consisting of 50 parts of water and 150 parts of acetic acid was added slowly and the mass was stirred for 30 minutes. 35 parts of sodium acetate dissolved in 50 parts of water and 75 parts of acetic acid were then added to neutralize any free sulfuric acid present. After 15 minutes of stirring 500 parts of water were added and the product completely dissolved. The solution was stirred for 2 hours while the temperature of the walls of the container was kept at approximately 100° F. whereupon the product was precipitated by adding isopropanol to the mixer. The sample was washed with isopropanol and dried at 140° F. The analysis of the product indicated a sulfur content of 8.98% and an apparent acetyl content of 21.4%.

*Example 2*

500 parts of acetic anhydride were cooled to 5° C. and the temperature was kept below 20° C. while 200 parts of 95% sulfuric acid were slowly added with stirring. There was then added 152.2 parts of powdered anhydrous sodium acetate, the solution being kept below 35° C. during the addition with continued stirring until a clear solution was obtained. This solution was held at about 20° C. until added to the cellulose pulp.

300 parts of cellulose which had been activated with water and dewatered with acetic acid were placed in a jacketed sigma bladed stirrer with 600 parts of acetic acid (410 parts on the cellulose as a result of dewatering and 190 parts additional). Contained in the 190 additional parts of acetic acid were 2.75 parts of 95% sulfuric acid. The contents were stirred for 15 minutes at 100° F. and the outside temperature was then lowered to 70° F. The cooled sulfating mixture prepared as described in the first paragraph was then added and the mixture was stirred for 30 minutes.

After a sulfation period of one-half hour, 250 parts of acetic anhydride and 350 parts of acetic acid containing 11 parts of 95% sulfuric acid were added to the mass and the mixer was run until a product having good water solubility was obtained which took 3½ hours from the addition of the acetylating mixture. At the end of the reaction, a mixture of 50 parts of water and 150 parts of acetic acid was added slowly and the mixture was stirred for 30 minutes. There were then added 35 parts of sodium acetate dissolved in a mixture of 50 parts of water and 75 parts of acetic acid. After stirring for 15 minutes 500 parts of water were added which produced a complete solution of the product. The solution was stirred for approximately 2 hours with an outside jacket temperature of 100° F. whereupon the product was precipitated by adding isopropanol to the mixer. The sample was washed with isopropanol at 140° F. The product obtained had a sulfur content of 9.1% and 21.5% apparent acetyl.

*Example 3*

To 420 parts of acetic anhydride cooled to 5° C. were slowly added with stirring 210 parts of 95% sulfuric acid, the temperature being kept below 20° C. throughout. To the solution was then added 160.2 parts of powdered anhydrous sodium acetate, the solution temperature being kept below 35° C. during the addition. Stirring was continued until a clear solution was obtained. This sulfating solution was held at about 20° C. until used for reacting upon wood pulp.

300 parts of wood pulp which had been activated with water and dewatered with acetic acid and which contained 410 parts of acetic acid were placed in a jacketed sigma bladed mixer together with 250 parts of propionic acid containing 2.7 parts of 95% sulfuric acid. The mixture was stirred for 15 minutes at 100° F. as a pretreatment and the outside temperature was then lowered to 70° F. The cooled, sulfating mixture from paragraph 1 was added and the mass was stirred for 30 minutes.

Following the sulfating period, 550 parts of propionic anhydride and 350 parts of propionic acid containing 21.6 parts of 95% sulfuric acid were added and the mass was stirred until water solubility was obtained which required approximately 6 hours. There was then added a mixture of 75 parts of water and 150 parts of acetic acid. After 10 minutes of stirring, a solution composed of 50 parts of sodium acetate, 75 parts of water and 75 parts of acetic acid was added. 1,000 parts of water were then added to dissolve the mass. Precipitation of the cellulose acetate propionate sulfate obtained was accomplished by adding isopropanol and stirring. The final product was washed with isopropanol at 140° F. Analysis of the dry material indicated 17.6% apparent acetyl and 9.94% sulfur content. The product obtained was water soluble giving good viscosities at low concentrations.

We claim:

1. A method of preparing a sulfated cellulose compound which comprises reacting upon a cellulose material having free and esterifiable hydroxyl groups selected from the group consisting of cellulose and hydrolyzed lower fatty acid esters of cellulose with an esterification bath comprising acetic anhydride, acetyl sulfuric acid and a salt of acetyl sulfuric acid, in the making of which esterification bath an excess of 3.5 to 27 parts of $H_2SO_4$ per 100 parts of the cellulose of the material being esterified is supplied over that which is equimolar to the alkali metal salt used in its preparation, at a temperature of 50–120° F. until a water soluble product is obtained.

2. A method of preparing cellulose acetate sulfate which comprises reacting upon cellulose with an esterification bath comprising acetic anhydride, acetyl sulfuric acid and a salt of acetyl sulfuric acid, in the making of which esterification bath an excess of 3.5 to 27 parts of $H_2SO_4$ per 100 parts of cellulose is supplied over that which is equimolar to the alkali metal salt used in its preparation, at a temperature of 50–120° F. until a water soluble product is obtained.

References Cited in the file of this patent
UNITED STATES PATENTS
2,143,332    Sindl et al. _____ Jan. 10, 1939